May 26, 1925.
F. HUBER
FOUR-WHEEL DRIVE FOR POWER VEHICLES
Filed April 16, 1924
1,539,417
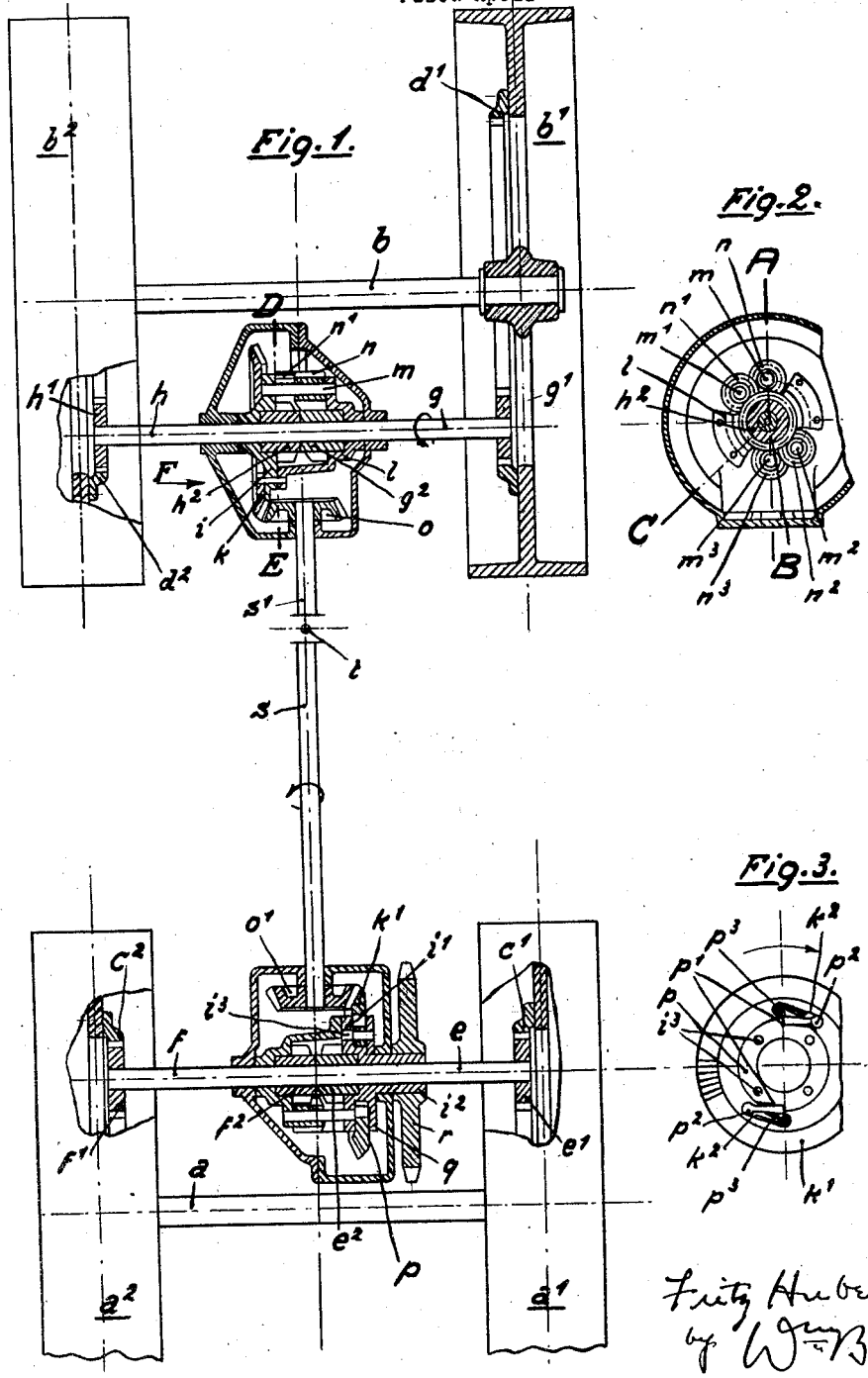

Patented May 26, 1925.

1,539,417

UNITED STATES PATENT OFFICE.

FRITZ HUBER, OF MANNHEIM, GERMANY, ASSIGNOR TO HEINRICH LANZ, OF MANNHEIM, BADEN, GERMANY, A COPARTNERSHIP.

FOUR-WHEEL DRIVE FOR POWER VEHICLES.

Application filed April 16, 1924. Serial No. 706,804.

*To all whom it may concern:*

Be it known that I, FRITZ HUBER, a citizen of Germany, residing in the city of Mannheim, Baden, Germany, have invented certain new and useful Improvements in a Four-Wheel Drive for Power Vehicles, of which the following is a specification.

In the four-wheel drive of power vehicles the conditions are frequently such that the rear and the front wheels rotate at different speeds. So far as such difference is due to a difference of wheel diameters, the difficulty can easily be remedied by the adoption of a suitable gear ratio. But when traveling in curves or in turning, for example, a difference in the rate of revolution will always be produced in case the fulcrum about which the two axles are deflected or set relative one to the other by the steering gear does not lie exactly in the system-center. Thus, if the fulcrum is located at a point nearer the rear wheels then these wheels will turn faster than the front wheels, and vice versa.

In order to obviate this difficulty, it has heretofore been proposed to provide the front wheels with a ratchet-wheel drive and the rear wheels, on the other hand with a fixed drive. But in this case the wheel diameters must be very accurately proportioned to the gear ratio, and even then the front and rear wheels will be driven at equal peripheral speed only on relatively slight curves. The front wheels can run free only on still smaller curves, while on all sharper curves the same difficulties will nevertheless be experienced.

My present invention, by which I have eliminated all trouble due to a difference in the rate of revolution of the wheels in a four-wheel drive, consists, broadly, in the interposing of a differential gear both between the two front and between the two rear running wheels and in driving one of these two differential gears by means of a coastermounted or free-wheel gear.

The invention is shown, by way of illustration, in the accompanying drawings, wherein—

Fig. 1 is a view showing, partly in plan and partly in section, so much of one specific embodiment of my improved drive as is necessary for a full understanding thereof, the section through both differentials being taken upon the line A B C of Fig. 2; Fig. 2 is a sectional view of the upper differential, on the line D E of Fig. 1 and looking in the direction of the arrow F; and Fig. 3 is a view showing, in side elevation and detached, the coaster-mounted or free-wheel gear incorporated in the lower differential.

Referring to the drawings, $a$ indicates one, preferably the front, axle of the vehicle and $b$ the other axle, both dead axles, upon which rotate the running wheels $a^1$ $a^2$ and $b^1$ $b^2$, respectively. The running wheels carry internal spur gears $c^1$ $c^2$ and $d^1$ $d^2$ with which mesh the pinions $e^1$ $f^1$ $g^1$ $h^1$ of the differential shafts $e$ $f$ $g$ $h$, which shafts have fixed on their inner ends, respectively, the spur master gears $e^2$ $f^2$ $g^2$ $h^2$.

Mounted free on the shaft $h$ is a flange $i$ which is secured by screws or otherwise both to the bevel gear $k$ and to the differential case $l$; and upon bolts $m$ $m^1$ $m^2$ $m^3$, fixed at one end in the flange and at the other end in the bottom wall of the case, rotate two pairs of spur pinions $n$ $n^1$ and $n^2$ $n^3$, $n$ and $n^3$ in engagement with the master gear $g^2$ and $n^1$ and $n^2$ in engagement with the master gear $h^2$, which as usual are wider than the gears so that the two pinions of each pair will overlap each other and mesh together.

Accordingly, when the bevel gear $k$ is driven by the bevel gear $o$, it will cause the flange $i$ and case $l$ to rotate and to carry with them the four pinions which in turn, the running wheels $b^1$ $b^2$ offering equal resistance, will drive the master gears and consequently the running wheels at the same speed. If, however, one of the running wheels, $b^1$ for example, offers a greater resistance to the propelling effort than does the other, then pinions $n$ $n^3$, actuated by the gear $g^2$, will turn on their axes and in so doing will cause pinions $n^1$ $n^2$ to turn and thereby impart a higher speed to the gear $h^2$ and to the running wheel $b^2$.

The epicyclic gearing which is associated with the shafts $e$ and $f$ is of the same general construction as that above described. But here a coaster or free-wheel connection is interposed between the bevel gear $k^1$ and the flange $i^1$, the arrangement being as follows: The flange $i^1$, carrying integral therewith the bush $i^2$, is secured by bolts $i^3$ to a coaster disk $p$ and counter disk $q$. The bevel gear $k^1$ is mounted to rotate upon the coaster disk $p$ and carries, set in a suitable recess or recesses provided for the purpose in one of its sides, the pawls $p^2$ which are yieldably held by springs $p^3$ in the tooth notches $p^1$ formed in the periphery of the disk. A sprocket $r$, through which the propelling power is transmitted from the engine to the vehicle, is keyed upon the bush $i^2$.

In operation, the rotation of the sprocket $r$ causes both the disk $i^1$ and the coaster disk $p$ to turn, the disk $i^1$ carrying with it the pinions and thereby causing to revolve the master gears $e^2$ $f^2$, the shafts $e$ $f$, and the running wheels $a^1$ $a^2$. Simultaneously therewith, the bevel gear $k^1$ is caused to rotate, by the engagement of its pawls $p^2$ with the toothed end of the notches in the coaster disk, and in turning transmits its rotary movement to the bevel gear $o^1$, the shaft sections $s$ $s^1$, the bevel gear $o$, and thence to the differential gear of the shafts $g$ $h$ in the manner herein-above described. The shaft sections $s$ $s^1$ are connected, at the point $t$, by a Cardan or other suitable universal joint, which needs no description. When traveling on a curve, the arc described, and consequently the length of the path covered, by the pair of running wheels $a^1$ $a^2$ will be smaller than that described by the running wheels $b^1$ $b^2$. The latter pair of wheels, therefore, must necessarily revolve at a greater speed than the first pair, and hence the bevel gear $k^1$ simply draws its pawls from the notches and overruns the coaster disk. The result is that, the wheels $b^1$ $b^2$ running free of the drive, a grinding of these wheels on the ground is prevented and the entire gearing system is relieved of much of the stress to which it otherwise would have been subjected.

It is to be understood that any other type of differential gear may be substituted for the one herein specifically shown and described and that the invention may be further modified in its various details.

What I claim as new, and desire to secure by Letters Patent, is—

1. A four-wheel drive for power vehicles in which two differential gears driving each a wheel pair are operatively connected through a free-wheel connection incorporated in one differential gear and said differential gear is driven from the engine and in turn drives the other through said free-wheel connection.

2. A four-wheel drive for power vehicles comprising a differential gear which is driven from the engine and drives one of the two pairs of running wheels and a second differential gear which is driven from the engine through a free-wheel gear housed within the housing of the first differential gear and driving an articulated longitudinal shaft geared to the second differential gear within the housing of the latter and which in turn drives the other pair of running wheels.

3. In a four-wheel drive for power vehicles the combination, with two wheel pairs each mounted to rotate upon a dead axle, of a differential gear which is driven from the engine and drives a divided shaft geared to the wheels of one wheel pair and a second differential gear which is driven from the first through a free-wheel gear housed within the housing of said first differential gear and in turn drives a divided shaft geared to the wheels of the second wheel pair.

4. In a four-wheel drive for power vehicles in which the two pairs of running wheels describe different arcs when traveling on curves, the combination of a differential gear which is driven from the engine and drives that pair of the running wheels which on curves describes the smaller arc and a second differential gear which is driven from a member of the first differential gear through a free-wheel connection and in turn drives the other pair of running wheels.

5. A four-wheel drive for power vehicles in which the fulcrum is located nearer one wheel pair than the other and the two wheel pairs will consequently have a different average peripherial speed, comprising two differential gears one of which is driven from the engine with a fixed drive and drives the wheel pair having the lesser average peripheral speed and the other is driven through a free-wheel connection and drives the wheel pair having the greater average peripheral speed.

Dr. FRITZ HUBER.

Witnesses:
 HELMUT LINDNER,
 VALENTIN WADEELS.